(12) United States Patent
Martinez

(10) Patent No.: US 9,162,173 B1
(45) Date of Patent: Oct. 20, 2015

(54) AIR FILTRATION ASSEMBLY

(71) Applicant: Kent Martinez, Sante Fe, NM (US)

(72) Inventor: Kent Martinez, Sante Fe, NM (US)

(*) Notice: Subject to any disclaimer, the term of this patent is extended or adjusted under 35 U.S.C. 154(b) by 3 days.

(21) Appl. No.: 14/173,555

(22) Filed: Feb. 5, 2014

(51) Int. Cl.
  *F24F 3/00* (2006.01)
  *B01D 46/00* (2006.01)
  *F24F 3/16* (2006.01)
  *F24F 1/00* (2011.01)

(52) U.S. Cl.
  CPC .......... *B01D 46/0041* (2013.01); *F24F 3/1603* (2013.01); *F24F 2001/0096* (2013.01)

(58) Field of Classification Search
  CPC ............ F24F 3/1603; F24F 2001/0096; F24F 2003/1682; H01T 23/00
  USPC ...................... 55/356, 422, 471; 96/63, 80, 97
  See application file for complete search history.

(56) References Cited

U.S. PATENT DOCUMENTS

| D252,640 S | 8/1979 | Nederman | |
|---|---|---|---|
| 5,578,113 A * | 11/1996 | Glenn | ................................. 96/52 |
| 5,601,636 A * | 2/1997 | Glucksman | ........................ 96/63 |
| 5,861,127 A * | 1/1999 | Yeh | .................................. 422/121 |
| 5,877,896 A | 3/1999 | Gremban | |
| D427,783 S | 7/2000 | Luedke | |
| 6,152,567 A | 11/2000 | LaForgia | |
| 6,158,530 A * | 12/2000 | Bowen et al. | .................. 131/175 |
| 6,464,760 B1 * | 10/2002 | Sham et al. | .................... 96/117.5 |
| 7,134,758 B1 | 11/2006 | Baker | |
| 7,789,921 B2 | 9/2010 | Thurin et al. | |
| 2004/0031248 A1 * | 2/2004 | Lindsay | ......................... 55/385.3 |
| 2006/0034737 A1 * | 2/2006 | Beam et al. | ............... 422/186.07 |
| 2007/0034082 A1 * | 2/2007 | Adair et al. | ......................... 96/63 |
| 2008/0286163 A1 * | 11/2008 | Garfield et al. | ................ 422/120 |
| 2009/0053113 A1 * | 2/2009 | Mai | ................................. 422/121 |
| 2014/0360496 A1 * | 12/2014 | Reese | ........................ 128/200.28 |
| 2015/0022934 A1 * | 1/2015 | Lin | ................................. 361/231 |

* cited by examiner

*Primary Examiner* — Duane Smith
*Assistant Examiner* — Minh-Chau Pham

(57) ABSTRACT

An air filtration assembly for selectively eliminating smoke from an area includes a housing that may be coupled to a support surface. A motor is coupled to the housing. A fan is operationally coupled to the motor. The motor moves the fan. An actuator is coupled to the housing. The actuator is operationally coupled to the motor so the actuator selectively actuates the motor. A filter is coupled to the housing. The filter is operationally coupled to the fan. The fan draws air through the filter so the filter removes smoke from the air. A screen is operationally coupled to the housing. The screen is selectively extendable from the housing.

16 Claims, 3 Drawing Sheets

AIR FILTRATION ASSEMBLY

BACKGROUND OF THE DISCLOSURE

1. Field of the Disclosure

The disclosure relates to air filtration devices and more particularly pertains to a new air filtration device for selectively eliminating smoke from an area.

2. Summary of the Disclosure

An embodiment of the disclosure meets the needs presented above by generally comprising a housing that may be coupled to a support surface. A motor is coupled to the housing. A fan is operationally coupled to the motor. The motor moves the fan. An actuator is coupled to the housing. The actuator is operationally coupled to the motor so the actuator selectively actuates the motor. A filter is coupled to the housing. The filter is operationally coupled to the fan. The fan draws air through the filter so the filter removes smoke from the air. A screen is operationally coupled to the housing. The screen is selectively extendable from the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
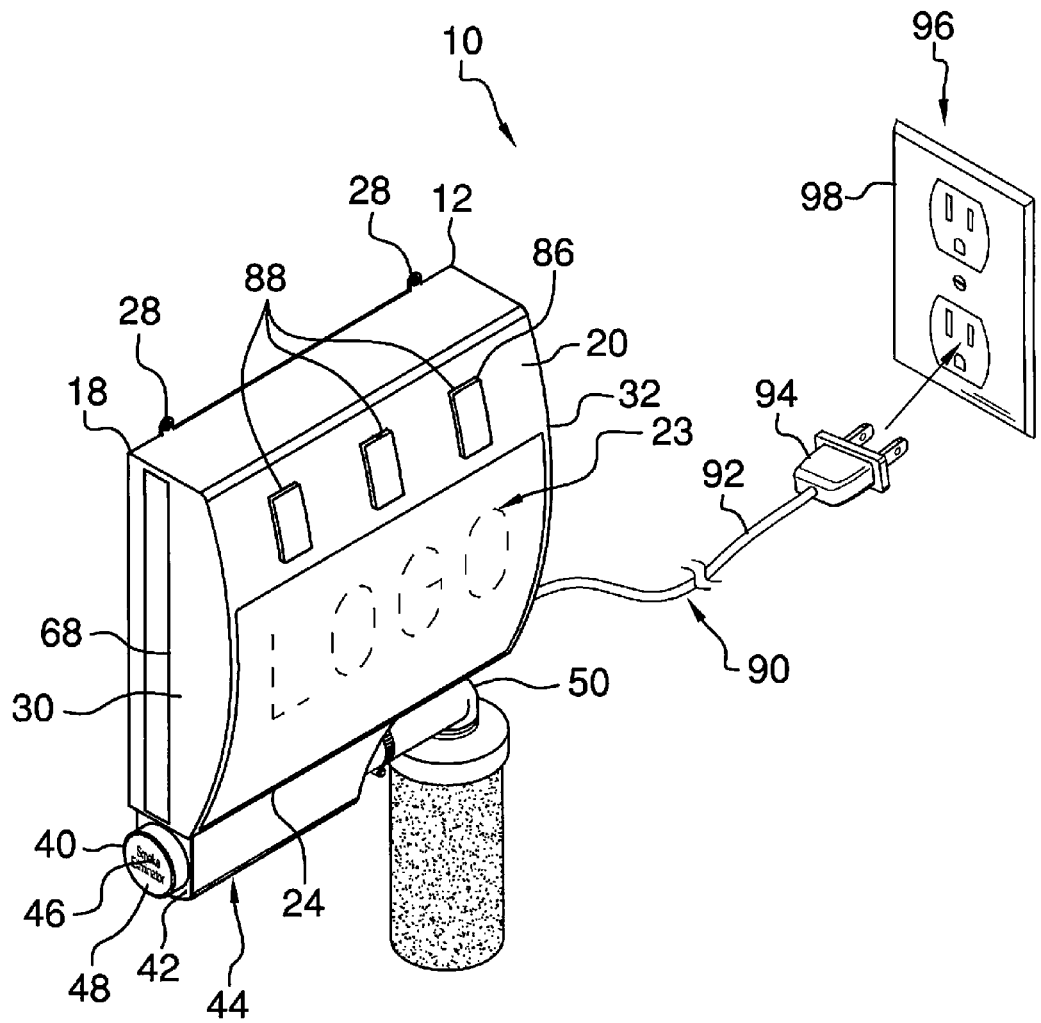
FIG. 1 is a front perspective view of a air filtration assembly according to an embodiment of the disclosure.
Figure 2:
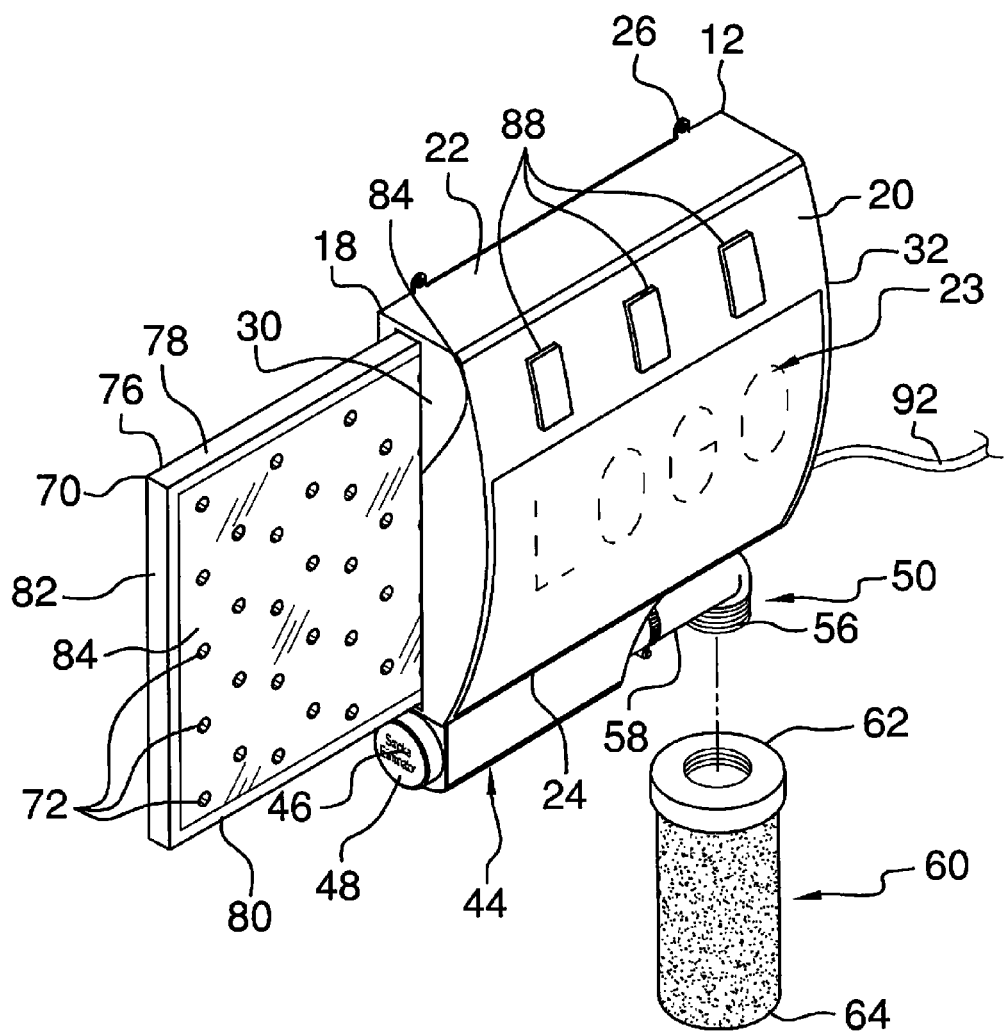
FIG. 2 is a top perspective view of an embodiment of the disclosure.
Figure 3:
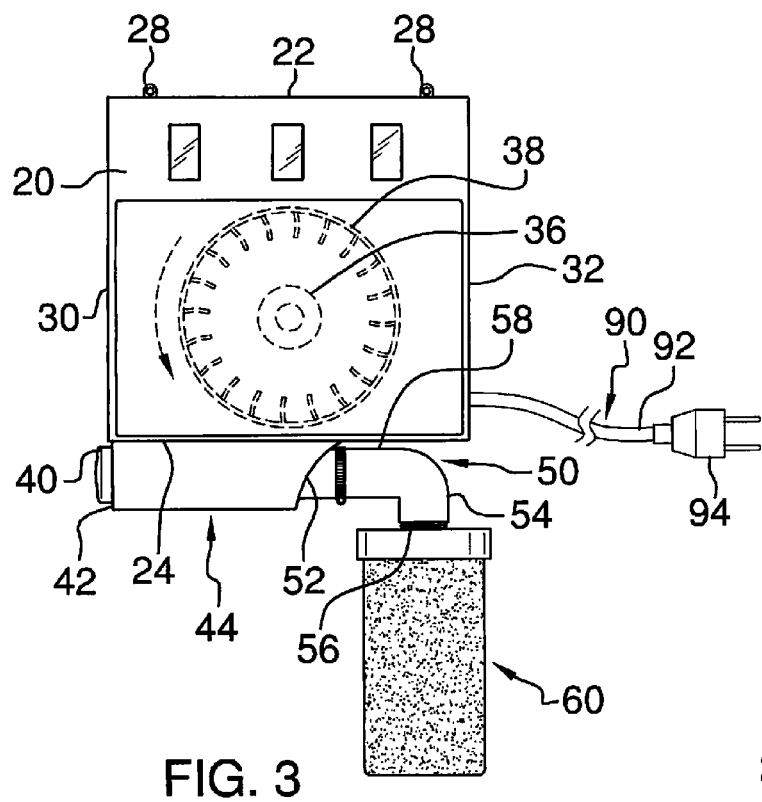
FIG. 3 is a front view of an embodiment of the disclosure.
Figure 4:
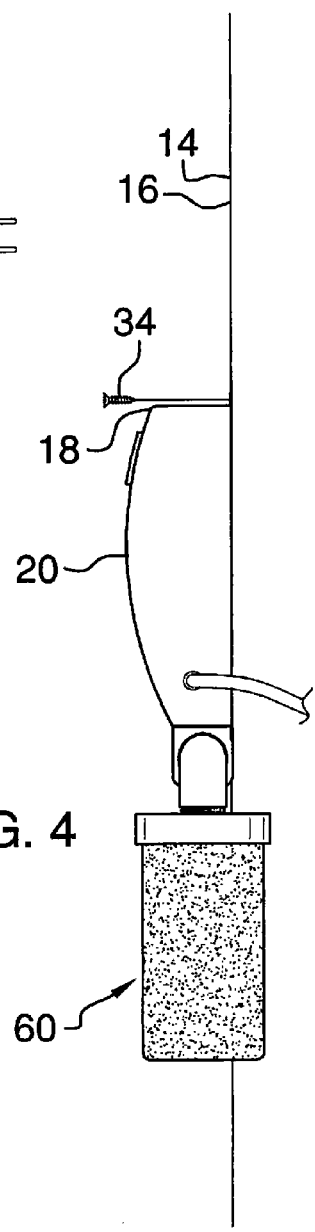
FIG. 4 is a right side view of an embodiment of the disclosure.

With reference now to the drawings, and in particular to FIGS. 1 through 4 thereof, a new air filtration device embodying the principles and concepts of an embodiment of the disclosure and generally designated by the reference numeral 10 will be described.

As best illustrated in FIGS. 1 through 4, the air filtration assembly 10 generally comprises a housing 12 that may be coupled to a support surface 14. The support surface 14 may be a gambling machine 16 of any conventional design. An outer wall 18 of the housing 12 has a width that is greater than a height of the outer wall 18 of the housing 12. The housing 12 has a rectangular parallelepiped shape that may have a width and a height between 20 cm and 30 cm and a depth between 5 cm and 8 cm. A front side 20 of the outer wall 18 of the housing 12 curves outwardly between a top side 22 and a bottom side 24 of the outer wall 18 of the housing 12. Indicia 23 is printed on the front side 20 of the outer wall 18 of the housing 12.

A tab 26 is coupled to and extends upwardly from the top side 22 of the outer wall 18 of the housing 12. The tab 26 is one of a pair of tabs 28. Each of the pair of tabs 28 is positioned proximate an associated one of a first lateral side 30 and a second lateral side 32 of the outer wall 18 of the housing 12. A pair of fasteners 34 extends through each of the pair of tabs 28 and engages the support surface 14 so the housing 12 is retained on the support surface 14.

A motor 36 is coupled to the housing 12. The motor 36 may be an electrical motor of any conventional design. A fan 38 is rotatably coupled to the motor 36. The fan 38 is positioned within an interior of the housing 12. Lastly, the fan 38 may be a squirrel cage fan of any conventional design.

An actuator 40 is coupled to a first lateral side 42 of an intake portion 44 of the housing 12. The actuator 40 is electrically coupled to the motor 36. Moreover, the actuator 40 selectively actuates the motor 36. Indicia 46 is printed on a face 48 of the actuator 40. The indicia 46 comprise English letters spelling "Smoke Eliminator".

An L-shaped tube 50 is coupled to and extends laterally away from a second lateral side 52 of the intake portion 44 of the housing 12. A vertical portion 54 of the L-shaped tube 50 extends downwardly from the housing 12. The L-shaped tube 50 is in fluid communication with the fan 38. Additionally, the fan 38 urges air inwardly through an open bottom end 56 of the L-shaped tube 50. A lateral portion 58 of the L-shaped tube 50 may have a length between 5 cm and 8 cm. Lastly, the vertical portion 54 of the L-shaped tube 50 may have a length between 2 cm and 4 cm.

A filter 60 is elongated along a longitudinal axis extending through an open top end 62 and a bottom end 64 of the filter 60. The open top end 62 of the filter 60 threadably engages the open bottom end 56 of the L-shaped tube 50. Additionally, the filter 60 is removably coupled to the L-shaped tube 50. The fan 38 draws air through the filter 60 so the filter 60 removes smoke from the air. Lastly, the filter 60 may be comprised of a deformable and air permeable material such as sponge or other similar material.

A screen slot 68 extends through the first lateral side 30 of the outer wall 18 of the housing 12. The screen slot 68 extends between the top side 22 and the bottom side 24 of the outer wall 18 of the housing 12. A screen 70 is slidably coupled to the housing 12. The screen 70 may have a width and a height between 15 cm and 25 cm.

The screen 70 is positionable in an extended position so the screen 70 extends outwardly from the screen slot 68. Moreover, the screen 70 is positionable in a retracted position so the screen 70 is positioned within an interior of the housing 12. The screen 70 may be comprised of a rigid and light reflective material such as glass or other similar material. A plurality of apertures 72 extends through a front side 74 and a back side 76 of the screen 70. Lastly, the plurality of apertures 72 is evenly distributed between a top side 78, a bottom side 80, a first lateral side 82 and a second lateral side 84 of the screen 70.

A light emitter 86 is coupled to the front side 20 of the outer wall 18 of the housing 12. The light emitter 86 is positioned proximate the top side 22 of the outer wall 18 of the housing 12. Additionally, the light emitter 86 may be an LED of any conventional design. Further, the light emitter 86 is electrically coupled to the actuator 40. The light emitter 86 is one of a plurality of light emitters 88. Lastly, the plurality of light emitters 88 is evenly distributed between the first 30 and second lateral sides 32 of the outer wall 18 of the housing 12.

A power supply 90 is coupled to the housing 12. The power supply 90 is electrically coupled to the actuator 40. Further, the power supply 90 comprises a power cord 92 extending outwardly from the second lateral side 32 of the outer wall 18 of the housing 12. A free end 94 of the power cord 92 is selectively electrically coupled to a power source 96. The power source 96 may be an electrical outlet 98 of any conventional design.

In use, a user actuates the actuator 40 whenever smoke is present proximate the user. Additionally, the user 98 positions the screen 70 in the extended position if the user wishes to limit the visibility of an observer. The filter 60 removes smoke from the air so the user does not have to breathe the smoke. Lastly, the user actuates or de-actuates the actuator 40 at any desired time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An air filtration assembly for selectively eliminating smoke from an area, said assembly comprising:
   a housing configured to be coupled to a support surface;
   a motor coupled to said housing;
   a fan operationally coupled to said motor wherein said motor moves said fan;
   an actuator coupled to said housing, said actuator being operationally coupled to said motor wherein said actuator selectively actuates said motor;
   a filter coupled to said housing, said filter being operationally coupled to said fan wherein said fan draws air through said filter wherein said filter removes smoke from the air;
   a screen operationally coupled to said housing wherein said screen is selectively extendable from said housing; and
   an L-shaped tube coupled to and extending laterally away from a second lateral side of an intake portion of said housing wherein a vertical portion of said L-shaped tube extends downwardly from said housing.

2. The assembly according to claim 1 further comprising an outer wall of said housing having a width being greater than a height of said outer wall of said housing wherein said housing has a rectangular parallelepiped shape.

3. The assembly according to claim 1 further comprising said fan being rotatably coupled to said motor wherein said fan is positioned within an interior of said housing.

4. The assembly according to claim 1 further comprising said actuator being coupled to a first lateral side of an intake portion of said housing.

5. The assembly according to claim 1 further comprising said actuator being electrically coupled to said motor.

6. The assembly according to claim 1 further comprising said L-shaped tube being in fluid communication with said fan wherein said fan urges air inwardly through an open bottom end of said L-shaped tube.

7. The assembly according to claim 1 further comprising said filter being elongated along a longitudinal axis extending through a open top end and a bottom end of said filter.

8. The assembly according to claim 1 further comprising an open top end of said filter threadably engaging an open bottom end of said L-shaped tube wherein said filter is removably coupled to said L-shaped tube.

9. The assembly according to claim 1 further comprising a screen slot extending through a first lateral side of an outer wall of said housing wherein said screen slot extends between a top side and a bottom side of said outer wall of said housing.

10. The assembly according to claim 1 further comprising said screen being slidably coupled to said housing.

11. The assembly according to claim 1 further comprising said screen being positionable in an extended position wherein said screen extends outwardly from a screen slot.

12. The assembly according to claim 1 further comprising said screen being positionable in a retracted position wherein said screen is positioned within an interior of said housing.

13. The assembly according to claim 1 further comprising a power supply coupled to said housing.

14. The assembly according to claim 13 further comprising said power supply being electrically coupled to said actuator.

15. The assembly according to claim 14 further comprising said power supply comprising a power cord extending outwardly from a second lateral side of an outer wall of said housing.

16. An air filtration assembly for selectively eliminating smoke from an area, said assembly comprising:
   a housing configured to be coupled to a support surface, an outer wall of said housing having a width being greater than a height of said outer wall of said housing wherein said housing has a rectangular parallelepiped shape;
   a motor coupled to said housing;
   a fan rotatably coupled to said motor wherein said fan is positioned within an interior of said housing;
   an actuator coupled to a first lateral side of an intake portion of said housing, said actuator being electrically coupled to said motor wherein said actuator selectively actuates said motor;
   an L-shaped tube coupled to and extending laterally away from a second lateral side of said intake portion of said housing wherein a vertical portion of said L-shaped tube extends downwardly from said housing, said L-shaped tube being in fluid communication with said fan wherein said fan urges air inwardly through an open bottom end of said L-shaped tube;
   a filter being elongated along a longitudinal axis extending through an open top end and a bottom end of said filter, said open top end of said filter threadably engaging an open bottom end of said L-shaped tube wherein said filter is removably coupled to said L-shaped tube wherein said fan draws air through said filter wherein said filter removes smoke from the air;
   a screen slot extending through a first lateral side of said outer wall of said housing wherein said screen slot extends between a top side and a bottom side of said outer wall of said housing;

a screen slidably coupled to said housing, said screen being positionable in an extended position wherein said screen extends outwardly from said screen slot, said screen being positionable in a retracted position wherein said screen is positioned within an interior of said housing; and a power supply coupled to said housing, said power supply being electrically coupled to said actuator, said power supply comprising a power cord extending outwardly from a second lateral side of said outer wall of said housing.

* * * * *